United States Patent [19]

Wright

[11] 4,311,397

[45] Jan. 19, 1982

[54] PROCESSOR FOR DOUGH WORKING

[75] Inventor: Edward J. Wright, Chesterton, near Peterborough, England

[73] Assignee: Baker Perkins Holdings Limited, Peterborough, England

[21] Appl. No.: 12,910

[22] Filed: Feb. 16, 1979

[30] Foreign Application Priority Data

Feb. 15, 1978 [GB] United Kingdom ............... 6039/78
Feb. 15, 1978 [GB] United Kingdom ............... 6070/78

[51] Int. Cl.³ ............................................. B29B 1/06
[52] U.S. Cl. ..................................... 366/98; 366/287; 366/309
[58] Field of Search ................. 366/287, 288, 309, 97, 366/98, 96, 69

[56] References Cited

U.S. PATENT DOCUMENTS 1,475,978 12/1923 Westerman ........................ 366/287
3,677,100 7/1972 Kajiwara ............................ 366/287

FOREIGN PATENT DOCUMENTS 1187140 4/1970 United Kingdom ................ 366/287

Primary Examiner—Robert W. Jenkins
Attorney, Agent, or Firm—Learman & McCulloch

[57] ABSTRACT

A processor has a working receptacle with a part-spherical internal wall. There is a working element which can execute either simple rotary motion about a single axis or planetary motion about two axes which intersect at the geometric center of the part-spherical internal wall. There are control means for enabling simple rotary motion or planetary motion to be effected.

Dough is worked by hydrating the mix and then completing development at a substantially greater energy input rate. The hydration stage can be considered as being carried out at such an energy input rate that substantial relaxation of the dough occurs, the development completion stage being considered to be carried out at an energy input rate at which no substantial relaxation of the dough occurs. Alternatively, in a more specific idea, the hydration stage is carried out using a working element with a planetary motion and the development completion stage is carried out using a working element with simple rotary motion.

10 Claims, 7 Drawing Figures

PROCESSOR FOR DOUGH WORKING

BACKGROUND OF THE INVENTION

The Processor

The present invention relates to a processor which is particularly applicable to working doughs or batters, eg. for bakery products such as bread or cakes, but which could be used for entirely different purposes, such as mixing paints or chemicals, being particularly suitable for semi-solids in general. The processor may carry out operations other than or in addition to mere mixing, for instance, hydration of a bread-dough mix or development of a bread dough.

U.S. Pat. No. 3,315,947, U.K. Pat. No. 1,129,244, French Pat. No. 2,336,168 and West German Offenlegungsschrift (DOS) No. 24 40 079 all disclose processors which utilise planetary motion. In DOS No. 24 40 079 the working element shaft does not rotate, though in one embodiment (FIG. 7) the working blade can rotate idly about the axis of its shaft, so that the blade can effect planetary motion about two axes which intersect. In all the remaining cases, the working element rotates relative to the receptacle about two axes which intersect, and in the particular case of French Pat. No. 2,336,168 (which can be for kneading dough), the receptacle is part-spherical and the axes can intersect at the geometrical centre of the part-sphere. However, in none of these cases is simple rotary motion of the mixing element provided for, and the processors are only for working or mixing in one mode of operation. In one embodiment (FIG. 7) of French Pat. No. 2,336,168, the receptacle is freely rotatable, ie. is not directly driven but is rotated by the reaction of the material in the receptacle, but there is no suggestion that the motion of the receptacle could be arrested.

U.S. Pat. No. 3,352,543, French Pat. 411,738, UK Pat. No. 1,053,493 and UK Pat. No. 890,355 disclose processors using simple rotary motion of a working element, about the geometric axis of the receptacle except in the case of UK Pat. No. 1,053,493, where the respective axes are parallel. French Pat. No. 411,738 and UK Pat. No. 890,355 disclose part-spherical receptacles, but the part-spherical shape is only incidental.

French Pat. Nos. 382,033 and 502,288 and French patent of Addition 9599 disclose dough kneaders having two working elements whose axes are coincident, or in French Pat. No. 502,288 are crossed and pass close to but not through the axis of the receptacle. The working elements can undergo planetary motion or a simple rotary motion about their own axes. The receptacle itself is not part-spherical and the working elements have a special shape so as to sweep the major part of the receptacle and so as to avoid fouling each other; if there were just one working element, it would not be possible for it to sweep the major part of the receptacle.

German Pat. No. 617,972 describes a stirrer/beater machine in which the working element can undergo simple rotary motion or planetary motion about two inclined and intersecting axes. Although the receptacle is substantially hemispherical, the working element can sweep only a small proportion of the volume of the receptacle when it undergoes simple rotary motion. German Pat. No. 619,914 makes use of basically the same machine, but in this case, the working element's planetary motion is about two parallel axes and the receptacle base is not of part-spherical shape. Furthermore, when the working element undergoes simple rotary motion, the motion is not about its own axis and it executes a quasiplanetary motion.

BACKGROUND OF THE INVENTION

Dough Working

The invention relates to working dough, and it is particularly applicable to working bread doughs, although it could also be applied to working other suitable doughs.

In mixing and working dough, four different effects occur, though these do not occur in precisely defined stages; the effects are mixing, hydration, primary development and secondary development.

Mixing is the mere mechanical mixing of the ingredients to distribute the particles or molecules uniformly. In hydration, the water in the mix is absorbed by the damaged starch granules of the flour as all suitable flours have a deliberate proportion of damaged starch granules so that they can absorb water in this manner; the undamaged starch granules do absorb some water, but very much more slowly.

The primary development of dough is the opening out of the gluten molecules (also called gluten fibrils) in the flour. The gluten molecules are initially of closely-packed, tightly coiled form, and can be opened out into fairly short helices with cross-connections.

The secondary development of dough is the breaking and re-attachment of the cross-connections. The cross-connections are fairly easily broken and the broken ends can re-attach in any chance combination. During the breaking and reattachment, free atoms such as oxygen or nitrogen atoms are inserted between the broken ends, producing a dough mass of long molecules which can stretch and enclose bubbles of gas. The re-arrangement of the cross-connections is catalysed by enzymes which occur naturally in flour.

The development of a dough (primary and secondary together) can be measured by its elasticity, the dough becoming more elastic as it develops further, and an operator can gauge the amount of development by the feel of the dough. However, dough can be over-developed, when it is too tough to be expanded properly by the gases during baking, and thus there is a peak development or optimum development, which in general terms can be gauged as that development at which the maximum increase in volume occurs on baking.

The theory and microscopic changes that occur during the four effects referred to have been described above in order to assist the reader, but, although it is believed they are correct, the invention is not intended to be limited thereby. There is a discussion of development in the Appendix to Report No. 13 (March 1968) of the Flour Milling and Baking Research Association, published at Chorleywood, England.

The terms "gross shear" and "nett shear" are used herein for convenience. Roughly, gross shear means mass deformation by a squeezing or wedging action which occurs when paste or dough is subjected to compression or stretch, giving slip between a large number of individual glutein molecules as many molecules slide over one another, in particular creating long-chain gluteins in preparation for re-forming them into a more cell-like structure. To give a rough indication, gross shear could be considered as that produced by a mixing element with no specific cutting or scissor-type action. Nett shear occurs when paste or dough is cut or shredded with a high velocity knife or guillotine action, giving a high rate of breakage of the molecule chains. Nett shear can be produced by a working element which cuts and co-operates with stationary elements to produce a scissor-type shearing action. Gross and nett shear are also related to the energy input into the dough or to the torque and speed of the dough kneader.

The terms "high energy", "low energy" and "critical energy level" are also used herein for convenience. These terms refer to the rate of energy imparted to the dough. When dough is deformed by a working element, it undergoes a deformation which is both plastic and elastic, and, due to its elastic properties, the dough recovers its shape (this is called relaxation) to a certain extent. The initial relaxation is fairly rapid but complete relaxation would take a long time, the time also depending on the impact of the working element on the dough. If a recurrent beating action is taking place, as in all mechanical dough kneaders, low energy is the rate of energy input into the dough at which substantial relaxation occurs between successive strokes, high energy is the rate at which no substantial relaxation occurs, and the critical energy level is the rate at which high energy becomes low energy, or vice versa, it being appreciated that this level can only be defined approximately and that this level varies from dough to dough. It is believed that if dough is only worked below the critical level, it never achieves optimum development.

The traditional commercial method of preparing bread dough was by mixing the ingredients together in batch form by low energy, gross shear mixing, leaving the mixture to ferment in bulk for about three hours, and then dividing the mixture for baking. During the fermentation stage, the natural enzymes in the flour caused development to occur.

Around 1963, there was a change-over in the United Kingdom to what is known as the Chorleywood process or mechanical dough development. In this process, an oxidising agent, such as ascorbic acid, was added to the mix and the ingredients were mixed and the mixture hydrated and developed (primary and secondary development) by a short period of high energy, nett shear mixing in a mixer which had rotating knives to provide a vigorous mechanical action, thereby breaking up the intermolecular cross-connections and incorporating free molecules of oxygen or nitrogen from the air. An alternative method which was suggested was to mix ingredients in a standard low energy gross shear mixer and then both hydrate and develop (primary and secondary development) the mixture in the high energy, nett shear mixer referred to above. A further alternative method was to mix, hydrate and develop (primary and secondary development) using a single high energy, simultaneous gross and nett shear machine.

The Chorleywood process gave great commercial advantages in that it could be accomplished in under five minutes with a total energy input of about 5 watt-hours per pound of dough, and the bulk fermentation stage was no longer necessary. The quality of the dough was however good, and could utilise flour of lower protein value, e.g. 11.5% w/w protein as against 12% w/w and above required for the traditional fermentation method. However the required baked volume was unobtainable with weak English flour of 9% w/w protein and below. This had to be supplemented with strong (i.e. higher protein) flour from imported hard wheat. A further disadvantage was that the dough heated up and the water added had to be chilled.

It is believed that there is another process where a spiral or helical, planetary working element is used, at high speed and low energy for hydration and at low speed and low energy for primary and secondary development, but no details are known of the process. The dough is not mechanically developed.

A further two-stage dough working method is described in Dutch Pat. No. 30263. High speed, low energy beating is used to develop a thin mix, e.g. containing only half the flour but three quarters of the water, and the resulting developed mix is then kneaded, apparently at low speed and low energy, with the remainder of the ingredients.

THE INVENTION

The Processor

According to the processor aspect of the invention, the working element can execute either simple rotary motion about a single axis or planetary motion about two axes which intersect. The working receptacle has a part-spherical internal wall and the geometric centre of the part-sphere is at the point of intersection of the two axes.

The combination of features of the invention enables simple rotary motion or planetary motion to be effected, at will, in a receptacle where the major part of the material being worked or mixed is subjected to the action of the mixing element, whether the mixing element is executing simple rotary motion or planetary motion. In particular, in a preferred embodiment where the mixing element executes simple rotary motion about an axis which is inclined to and intersects the axis of the receptacle, the part-spherical internal wall of the receptacle enables the radially outer surface of the working element to sweep the major part of the internal wall of the receptacle.

More particularly, the processor of the invention can be used to perform two different actions. Taking the instance of dough mixing, with simple rotary motion, the processor can be arranged to apply nett shear to the dough in that there is no squeezing action, but the dough is cut or shredded, and with planetary motion, the varying relationship between the working element and the receptacle can be arranged to apply gross shear, i.e. the contents are subjected to compression or stretch. Gross shear normally absorbs less power and thus the shear or the energy applied by the processor can be varied. The processor is particularly suitable for carrying out the method of the present invention.

Said radially outer surface of the working element will extend well above the bottom of the receptacle, and could extend above the part-spherical receptacle wall for substantially all of its path. In general, the processor can be arranged so that most of the part-spherical internal wall is swept, though some dead spaces may remain, e.g. at the very bottom of the receptacle, depending upon the material being worked or mixed. Though it may be possible to provide two working elements, it is preferred to have just a single working element.

There is preferably a scraper element which rotates in an upper part of the receptacle, and the preferred arrangement is for it to rotate when the working element executes planetary motion and to be stationary when the working element executes simple rotary motion; the interaction of the stationary scraper element and the rotating working element during simple rotary motion improves the cutting or shredding effect, and the scraper element also prevents rotation of the contents of the receptacle as a single mass.

In general, it would be possible to rotate the receptacle, but this is not preferred as the receptacle is heavy and would need large bearings, and would also absorb more power as it would have a high inertia. In addition, it is convenient to have the receptacle vertically movable for withdrawal of the working element, normally prior to discharging the contents of the receptacle, and it is simpler not to have this movement of the receptacle complicated by any drive for the receptacle itself.

If the working element is mounted on a rotary head, the arrangement is preferably such that the head can be held stationary for the non-planetary motion as rotating the head for non-planetary motion gives two problems; in changing from planetary to non-planetary motion, the working element must be stopped in the correct position in relation to the axis of the head, and for high energy, non-planetary motion, the whole of the head would have to rotate at high speed.

The drive means may be powered by two independent power units. Alternatively the same power unit can drive (alone or together with a subsidiary power unit) two drive mechanisms with the drive mechanisms interconnected by means of a clutch or change-speed drive. If the drive means comprises a main power unit and a control unit, the control is preferably a motor arranged to act as a brake when the reaction load on the motor exceeds a predetermined value. However, in general, the control unit can be a brake. The brake can be any suitable brake, for example, a magnetic particle brake, for applying a constant braking torque or a controllable braking torque; if the brake is actuated with not too high a braking torque, the processor will assume its lowest torque configuration and the processor could automatically change over its mode of operation during the course of working as the resistance of the ingredients or mixture changes—thus any slip on the brake could allow the processor to reduce the energy absorbed e.g. by changing gradually from planetary motion to simple rotary motion, i.e. by decreasing the orbital speed. In more general terms, the ratios of the speed of revolution about the two axes adjust the proportion of gross and nett shear mixing, i.e. the lower the rate of rotation about said other axis, the closer the shear is to nett shear. However, it has been found convenient to use a constant speed control unit whose energy input or consumption varies. Stated generally, a constant main power unit speed can be used whilst varying the manner in which the processor operates.

The use of the processor is not limited to the dough working method of the invention. For instance, for mixing a fruit cake batter, simply rotary motion can be used for the initial mixing of the batter without fruit, and planetary motion for mixing after the fruit has been added, the modes of operation being the reverse of those preferred for bread dough.

THE INVENTION

Dough Working

The method aspect of the invention can be expressed in two different ways. One method comprises hydrating the dough and subsequently completing development at a substantially greater energy input rate. The other method comprises hydrating the dough using a working element having a planetary motion, and subsequently using a working element having simple rotary motion to complete the development of the dough at a substantially greater rate of input of energy into the dough.

In rough terms, using the invention, it is believed that the speed and energy levels during the first stage are below the critical level or the minimum required for final structural development, or even for any substantial development in some ways of carrying out the process. The critical level for any particular dough can be ascertained by working successive batches of the dough at different energy input rates in the hydration stage, completing the working method, proving and baking the product. As the energy input rate increases for successive batches, there is a sudden fall off in baked volume when the energy input rate has exceeded the critical level.

In practice, it is found that the increase in energy input rate is accomplished by using a higher working element speed which initiates secondary development and causes the dough to give greater resistance to the motion of the working element.

The invention gives increased volume baked products for the same weight of dough, it is believed due to greater gas retention resulting from an improved cell structure for retaining the gas and an improved structure for withstanding the increased gas expansion. Using the same ingredients as for the Chorleywood process, the baked loaf could be 25 mm greater in height and 15% greater in volume, with no detectable microscopic change in structure or appearance. An oxidising agent may be necessary, as in the Chorleywood process, but no special atmosphere or ingredients are required.

In calculating the baked volume, the crust is also included although it is denser than the centre; however, as the crust is thin, the effect is not very great.

The invention also provides a bread which has been made from flour containing from 8% to 13% by weight of protein and which has a baked volume substantially equal to or greater than that defined by the relationship that for a standard loaf, wheat flour containing 8.5% by weight of protein gives a baked volume of 4 cc/gm and flour containing 11.8% by weight of protein gives a baked volume of 4.2 cc/gm or more. It has been found that baked volumes of about 4.1 cc/gm and about 4.3 cc/gm were produced using the mixing method of the invention with flours having 8.5% and 11.8% by weight of protein, respectively, in the specific case of a standard wheat loaf. Allowing 0.1 cc/gm for normal tolerances, it is believed that respective baked volumes of 4 cc/gm and 4.2 cc/gm or more can be produced in commercial bakeries from the two flours noted above. It is also believed that there is a definable relationship between the protein content of the flour and the baked volume. It is further believed that corresponding baked volumes can be calculated for other flours and for rolls or loaves of sizes other than the standard. A standard loaf weighs 0.878 Kg, has a baked volume of 4 cc/gm, is cuboidal with length 20.2 cms and width 12.6 cms and has a light crust.

As it is believed that hitherto it was impossible to produce a standard baked volume with flour containing less than 11.5% by weight of protein, the invention also provides a bread which has been made from flour containing less than 11.5% by weight of protein and which has a baked volume of 4 cc/gm or more.

In its simplest form, the first stage of the method of the invention can be carried out in one dough mixer or kneader, preferably with planetary motion, and the second stage be carried out in a dough kneader, preferably with simple rotary motion. In this way, the two processors concerned can be each used to their maximum efficiency, and it was found that the working times (ignoring the time taken to transfer the dough from one processor to the other) could be low, for instance about 2 and a quarter minutes; furthermore, total energy input levels can be relatively low, for instance about 5.5 watt-hours per Kg of dough, or more particularly about 8.8 watt-hours per Kg in the first stage and about 4.4 watt-hours per Kg after the rise in energy input rate. However, the transfer is inconvenient, and it was found that the whole of the dough working operation could be carried out in a single processor which had alternate planetary and simple rotary motion, a suitable processor being that of the invention. However, although the equipment costs could be reduced and the handling could be reduced, a similar method took about 4 minutes, and in particular about 3 and a half minutes in the first stage and about half a minute in the second stage. The total input of energy was about 6.6 watt-hours per Kg of dough, which was not an excessive increase. However, the cycle time was significantly in excess of that of existing dough kneaders, which are designed for a 3 minutes cycle time, as is associated equipment. It was then found that the cycle time could be reduced to 3 minutes if the energy input rate just before the energy input rate increase was just below the critical energy level, preferably with development completed at an energy input rate just above the critical level; the overall consumption of energy could be the same. There is a further advantage that the available horse-power (energy input rate) required was substantially less, and could for instance be reduced to a half. In this arrangement, about 75% of the energy could be provided in the first stage, the first stage apparently providing mainly primary development and the second stage providing mainly secondary development. This is in contrast to the methods in which the first stage is carried out at an energy input level which is much below the critical energy level, where very little development occurs during the first stage. Operating at just below the critical energy input level, there need be no separation into two distinct stages of (a) no development at all and (b) both primary and secondary development. Nonetheless, there is still a low total energy consumption and also large-volume baked products can be produced, provided that the energy imparted in the first stage is progressively consistent with the dough's ability to accept the energy input rate.

In addition to the large baked volumes, low overall cycle times and low total energy inputs required, the invention can also have other advantages. Cheaper wheat flour can be used, although in general the invention is applicable to strong or weak wheat flours, as well as to other wheat flours such as wheatmeal or wholemeal or even to the flours of grains other than wheat. It is also believed that the dough is tighter, ie. that more water (eg. up to 3% w/w more water) can be incorporated in the dough without the dough becoming too sticky, or, for the same amount of water, the dough is less sticky and has a drier appearance. However, using weak flour, a baked loaf of standard dimensions (4.0 cc/gms baked volume) was produced at 80% of the cost of a strong flour loaf produced by the Chorleywood process, due to the lower cost in the U.K. of wheat flour from wheat grown in the United Kingdom. Due to the relatively low energy consumption in the first stage, there is no substantial rise in temperature and the water supply need not be chilled. Gross shear can produce rapid and efficient hydration, especially if planetary motion is used. Furthermore planetary motion provides progressive kneading ie. alternating partial mixing and then resting of the dough free to relax, which is believed to reduce the energy required for completion of development. In addition, planetary motion tends to introduce and enfold or entrap air into the dough with even distribution thereof, and it is believed that the incorporation of small cells of free air has a beneficial effect on the final cell structure of the dough. Furthermore, planetary motion brings the ingredients into intimate contact and the entire mass approaches homogeneity simultaneously. In the processor of the invention, planetary motion effects gross shear or low energy working and simple rotary motion effects nett shear or high energy working.

It should be noted that other forms of processors could be used. For instance, instead of planetary motion, a continuous screw mixer could be used having re-circulating loops in which the dough could relax.

Particularly in methods in which the energy input rate is increased when hydration is complete and no substantial development has occurred, a skilled operator can gauge by the feel of the dough when the first stage should be terminated. However, the change-over can be signalled automatically and can be effected automatically. It has been found that the torque on the working element begins to rise when hydration is complete, even if the hydration has been accompanied by development. This rise in torque can determine the change-over point and the automatic signalling can be effected either by the rise in torque itself or a predetermined time after the cycle begins or, preferably, after a predetermined consumption of energy, these parameters being previously determined from the point at which the torque begins to rise. In practice, it is found that a suitable point is just before the torque begins to rise.

DESCRIPTION OF DRAWINGS

The invention will be further described, by way of example, with reference to the accompanying drawings, in which.

EMBODIMENTS OF THE PROCESSOR

Figures 1, 2, 3:
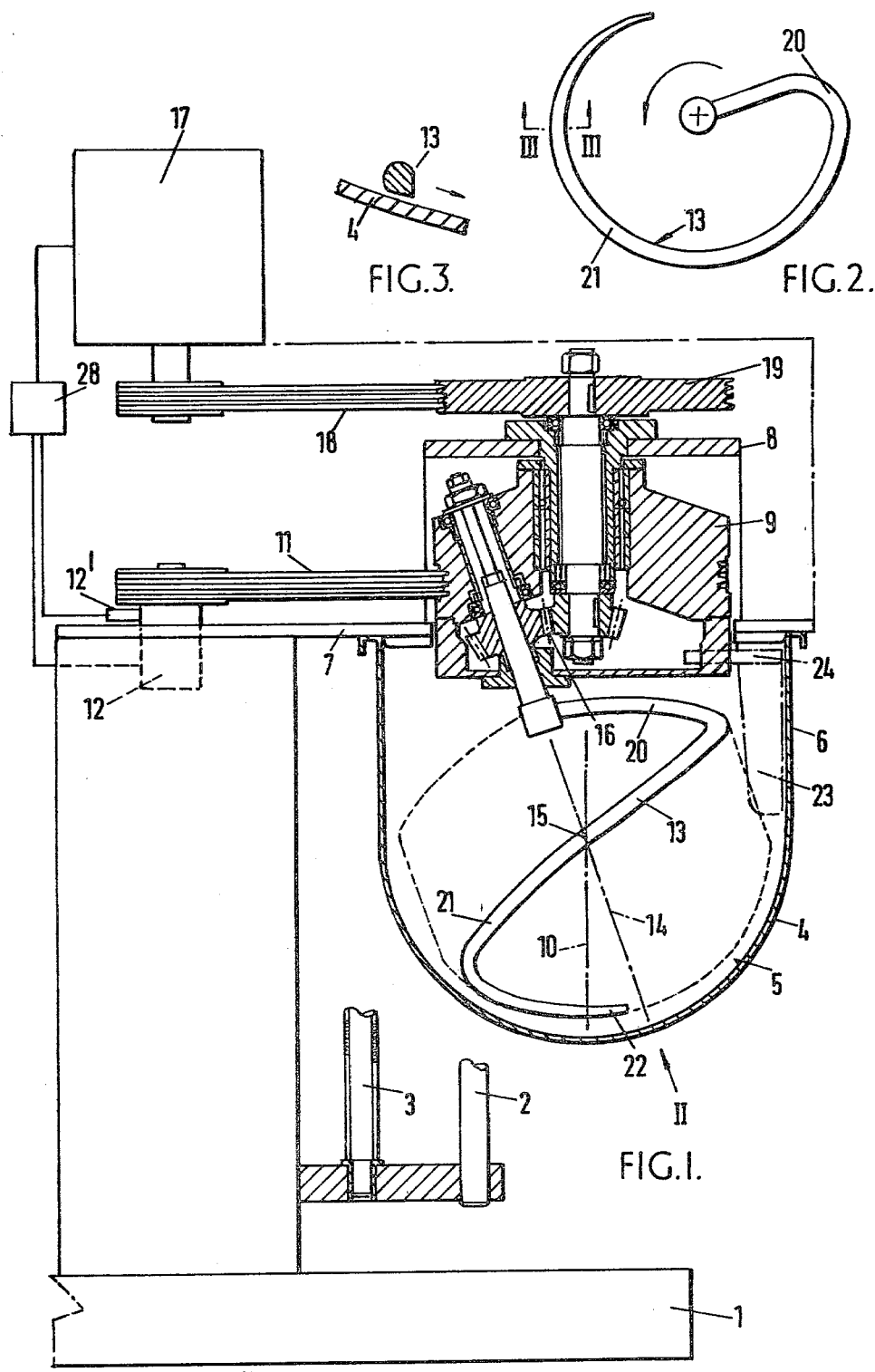
FIG. 1 is an elevation, mainly in axial section, of a first dough kneader in accordance with the invention.
FIG. 2 is a view of the working element, looking along its (inclined) axis in the direction of the arrow II in FIG. 1.
FIG. 3 is a cross-section through the working element, on a larger scale, generally along the line III—III in FIG. 2, part of the receptacle wall being shown.

The dough kneader of FIGS. 1 to 3 has a support stand 1 which carries a guide column 2 and screw spindle 3 for supporting and moving vertically a working receptacle in the form of a bowl 4. The guide column 2, screw spindle 3 and associated equipment are conventional, and are not shown in detail. The bowl 4 has a hemispherical bottom part 5 merging with an upper part 6 which is a right circular cylinder. The support stand 1 also carries a bowl cover 7 on which is mounted a bracket 8 carrying a rotary head 9. The head 9 is rotatable about a vertical axis 10 which is coincident with the axis of the bowl 4. The head 9 is connected by belts 11 to a control unit in the form of a constant speed electric motor 12, which is referred to as the precess motor. A static brake 12' is associated with the drive of the precess motor 12, and the static brake 12' can be used to hold the head 9 stationary while the precess motor 12 controls the rotation of the heat 9.

The head 9 mounts a working element 13 for rotation about an inclined axis 14 which intersects the vertical axis 10 at the geometric centre 15 of the bowl bottom part 5. The working element 13 can be rotated by means of a bevel gear drive 16 connected to a main power unit 17 by belts 18. It will be seen that the main drive pulley 19 has its axis coincident with the vertical axis 10 of the bowl 4.

The main power unit 17 is a constant speed electric motor while the precess motor 12 is arranged to act as a regenerative brake. The directions of rotation are such that the motion of the working element 13 about the inclined axis 14 is in the opposite sense to the motion of the head 9 about the vertical axis 10. The head 9 and gear drive 16 act as a differential drive connected to the main power unit 17 and to the precess motor 12, and the effect is that if the head 9 rotates, the speed of rotation of the working element 13 about its own inclined axis 14 is reduced by twice the speed of rotation of the head 9.

Figure 5:
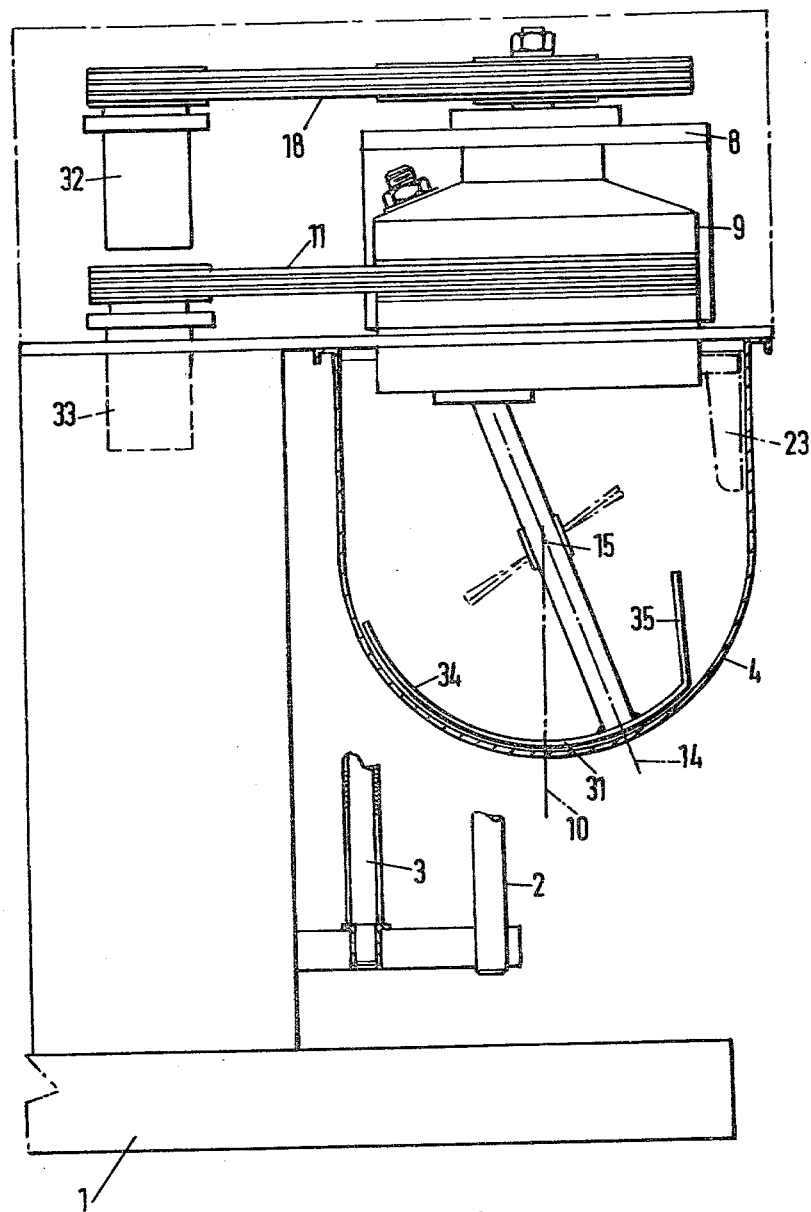
FIG. 5 is an elevation corresponding generally to that of FIG. 1, but showing a second dough kneader in accordace with the invention.
Figure 6:
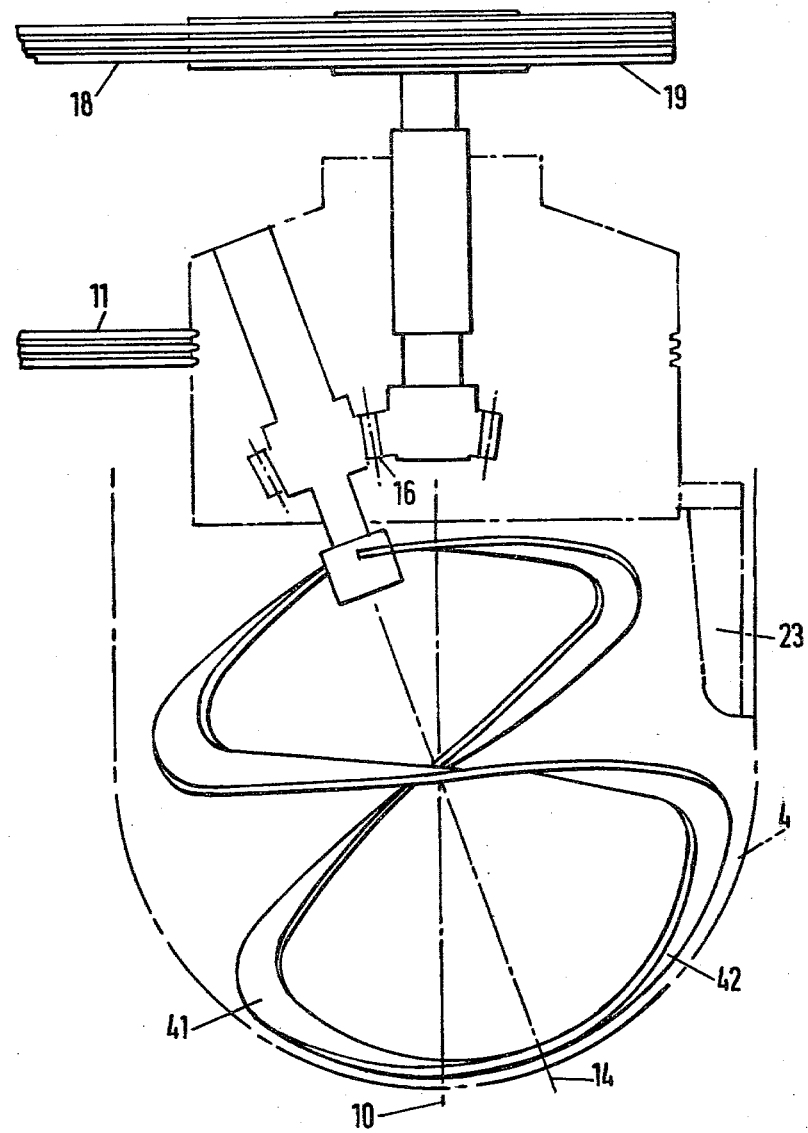
FIG. 6 is an elevation of part of a third dough kneader in accordance with the invention.

The working element 13 is shown as being rod-like in FIGS. 1 and 2, but may be in the form of a strip or ribbon, as shown in FIGS. 5 and 6. The working element 13 has a roughly helical part 21 whose axis is generally coincident with the axis 14, supported by a more strictly helical and then radial part 20. The roughly helical part 21 has a radially outer surface which is centred on the geometric centre 15 and is close to the inside of the bottom part 5 of the bowl 4 so that the roughly helical part 21 generates an imaginary part-sphere (shown dashed in FIG. 1) as the working element 13 rotates about either the vertical axis 10, or the inclined axis 14. The end portion 22 of the working element 13 is tapered and does not terminate on the inclined axis 14 so that a small dead space is left at the bottom of the bowl 4; however, as the material being worked or mixed is dough, the viscosity of the dough will ensure that no dough remains unmixed in this dead space. The shape of the roughly helical part 21 is such that when the working element 13 is rotating about the inclined axis 14, the radially outer surface extends above the bowl bottom part 5 for all of its path, in this way ensuring that the whole internal wall of the bowl bottom part 5 is swept, except for the dead space referred to above. As shown in FIG. 3, the portion of the working element 13 which provides the radially outer surface referred to above has a sharpened leading edge on its side nearer the inner wall of the bowl 4, and this would also be the case if the part 21 of the working element 13 were of ribbon or strip form. The arrows in FIGS. 2 and 3 indicate the direction of rotation of the working element 13 about the axis 14.

The head 9 mounts at least one scraper element 23 which rotates adjacent the inside of the bowl upper part 6. The preferred arrangement is to have four equi-spaced scraper elements 23, extending parallel to the vertical axis 10 and adjacent the path of the working element 13. To show the shape of the scraper element 23, the single scraper element 23 which is shown in FIG. 1 (and also in FIGS. 5 and 6) is shown in the plane of the section. However, in order to avoid the working element 13 fouling the scraper elements 23, the scraper element shown must be displaced through 45° about the vertical axis 10, with the other scraper elements 23 positioned accordingly. Each scraper element 23 is mounted on a short radial bar 24 which can be adjusted radially so that the scraper element 23 can be positioned very close to the inside of the bowl 4.

Figure 4:
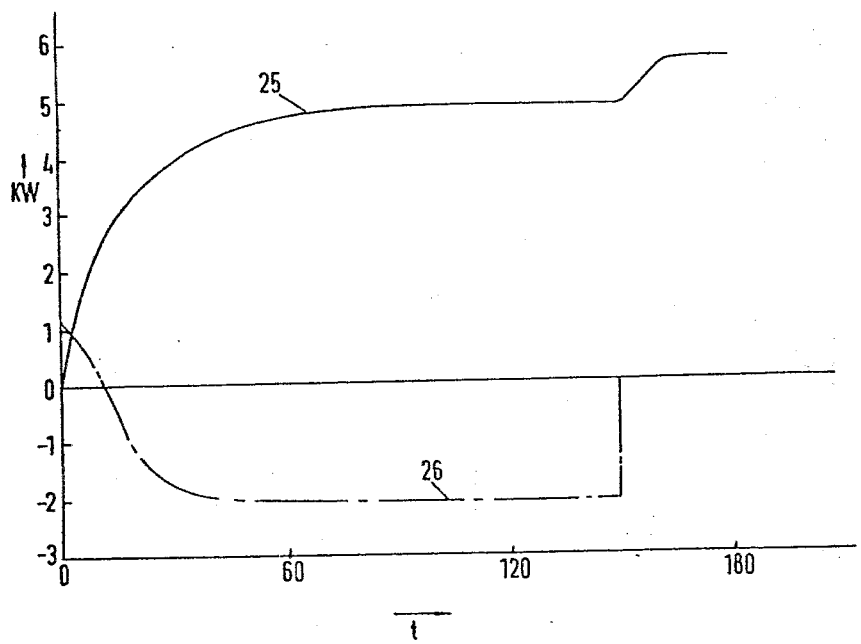
FIG. 4 is a graph of the energy consumption in kilowatts (KW) against time in seconds (t) during the operation of the kneader for mixing and working dough.

The operation of the dough kneader is described in relation to the dough working method which is explained in more detail herein. The progress of preferred method is represented by the curves 25 and 26 in FIG. 4.

The dough ingredients are fed to the bowl 4 when the bowl 4 is lowered and roughly reach just to the top of the bottom part 5; the bowl 4 is then raised into the position shown in FIG. 1. Power is supplied to the precess motor 12 and to the main power unit 17 at time t=0 (see FIG. 4). The optimum speeds of the precess motor 12 and of the main power unit 17 can be chosen according to the precise design of the bowl 4 and working element 13 as well as the ingredients being mixed, but in one example, the optimum initial rate of rotation about the vertical axis 10 was 56 rpm and 228 rpm about the inclined axis 14 (the ratio of speeds is not a whole number). The working element 13 thus rotates about the inclined axis 14 and orbits about the vertical axis 10, effecting a planetary motion, the scraper elements 23 rotating about the vertical axis 10. As initial mixing proceeds, the increased resistance of the dough causes a self-precessing reaction in the working element 13, and as the reaction load on the precess motor 12 exceeds a predetermined value (KW=0 in FIG. 4), the precess motor 12 becomes a regenerative brake and absorbs energy from the dough being mixed. Thus, looking at FIG. 4, the precess motor 12 is responsible for the rotation of the head 9 only for the first 12 to 15 seconds of the cycle, and at the point on the curve 26 when KW=0, the individual ingredients are approaching homogeneity as a dough. It will be seen that as the precess motor 12 absorbs energy the main power unit 17 must supply more energy.

Around the time t=150 seconds, the static brake 12' is applied to the drive shaft of the precess motor 12 and the precess motor 12 is disconnected from its electrical power supply. This then fixes the head 9 in position and the working element 13 can only rotate about the inclined axis 14, thus executing simple rotary motion. The scraper elements 23 are fixed and co-operate with the working element 13 to give a rapid shearing action. The scraper elements 23 also prevent any tendency of the dough to rotate as a single mass. The cycle is then continued until around t=180 seconds, when the power supply to the main power unit 17 is interrupted, the bowl 4 lowered and the mixed and developed dough discharged, ready for the next cycle.

The point at which the change-over from planetary to simple rotary motion is actuated can be determined in a number of ways, for instance using a simple timing device or using a full programme which, by controlling the precess motor 12, obliges the main power unit 17 to provide the energy input curve 25. Finer control can be obtained by controlling the smaller unit, i.e. the precess motor 12. However, a convenient arrangement is to provide means for sensing the power consumption of the main power unit 17 (or possibly of the precess motor 12), or the speed of rotation of the precess motor 12, and automatic means for actuating the change-over. Such means are indicated schematically in FIG. 1 at 28 and can be provided in a conventional manner. If desired, a known dough consistency control (not shown) can be provided.

The dough kneader of FIG. 5 is generally similar, but has a different working element 31 and two electric drive motors 32, 33 of about the same power.

The working element 31 has first and second portions 34, 35. Both axes 10, 14 pass through the first portion 34, which is part-circular as seen in section passing through the geometric centre 15 and is centred on the geometric centre 15. The first portion 34 is straight as seen looking towards the geometric centre 15. In this way, the first portion 34 generates an imaginary part-sphere when the working element 31 is rotated about either of the axes 10, 14. The second portion 35 has an outer surface which is not substantially parallel to the inside of the bowl bottom part 5 but is parallel or nearly parallel to the vertical axis 10; for instance, the second portion 35 can make an angle of not more than 10° with the axis 10, preferably about 5°. The working element 31 can be rod-like or ribbon-like or strip-like, as explained above in connection with the working element 13.

The use of the equal-power motors 32, 33 gives an alternative way of driving the kneader, but it is believed that it is less flexible and less convenient than the way described in relation to FIGS. 1 to 4.

FIG. 5 also indicates that a propeller-type subsidiary working element 36 can be mounted on the drive spindle 37 of the working element 31 where the drive spindle 37 passes through the geometric centre 15; the subsidiary working element 36 lies in a plane which is slightly inclined to the normal to the axis 14. The subsidiary working element 36 assists in controlling the dough mass within the bowl 4 and in particular prevents the dough mass rising too high around the drive spindle 37.

FIG. 6 illustrates a third working element 41 which can be considered as two roughly helical working elements as in FIG. 1 whose axes are both coincident with the inclined axis 14 and whose lower ends are joined together by a bottom portion 42 which can be straight as seen looking along the axis 14 or of slight or even pronounced S-shape; in other words, the bottom portion is generally diametrical, but need not be precisely so. Each of its ends merge with the respective roughly helical portions. The advantage of the FIG. 6 working element 41 is that there is no dead space at the bottom of the bowl 4.

It will be appreciated that the motors referred to above need not be electric motors. For instance, hydrostatic motors could be used.

EMBODIMENTS OF DOUGH WORKING METHODS

Three curves X, Y, and Z are shown. For curve X two conventional processors were used, namely a planetary mixer for the first stage and a rotary kneader having a simple rotary motion for the second stage. For curves Y and Z, the processor of FIGS. 1 to 3 was used, with planetary motion in the first stage and simple rotary motion in the second stage.

In each case, the bowl contained 50 lbs. (22.7 Kg.) of dough, and the mixture may be in accordance with any of Examples 3 to 8 below. In general, the shapes of the curves do not seem to be very dependant on the amount of dough being mixed or on the type of dough, though variations will occur.

The preferred curve for industrial practice is curve Z. Point A is the point at which near homogeneity has occured and point B is the point at which full hydration has occured and at which the first stage is terminated. Hydration begins before point A is reached, but is more significant after point A. At point B, about 75% of the total energy input will have occured, though the development is mainly mechanical development. The first stage provides the required mechanical development, but, as far as practicable, avoids structural development by keeping the energy input below the critical level, which critical level can be considered to be approximately as indicated by the line C. It is considered that the horizontal portion of the part of the curve A-B could be omitted by increasing the energy input more slowly.

At B there is a rapid increase in energy input to above the critical energy level (C), to reach a point D, and the energy input rate is kept constant until the mixing cycle is terminated at point E, at peak development of the dough. As can be seen, the energy input begins to decrease shortly after E as the dough becomes overdeveloped. In the particular processor concerned, which runs at constant speed, the resistance of the dough decreases just past E.

It was found that the temperature rise under normal operating conditions was only just over 9° C. and that no special chilling was required for the water.

The curve Z is an optimum curve, and it was found that if the energy input followed this curve, the largest volume baked products were obtained.

The particular processor used has constant speed motors, and thus the energy consumed is a measure of the speed of the working element. In practice, it has been found that the energy (or the torque) are not completely satisfactory indications of the performance of the processor and that doughs mixed with the same total energy input can have different volumes when baked. However, as indicated above, using the particular processor referred to, following the optimum energy curve Z ensures that the working element speed is always optimal.

The total energy input for curve Z was 6.6 watt-hours per Kg, and it will be seen that the maximum first stage energy input level was about 0.21 KW while the maximum second stage energy input level was about 0.25 KW about 20% greater than the first stage maximum.

The curve Y shows a different method, but the same references are used to indicate corresponding points. The total energy input was again 6.6 watt-hours per Kg, but the first stage was terminated when about one-third of the total energy input had been supplied. The cycle time was longer and the peak energy requirement of the power units was significantly greater although the dough produced was similar in quality. It is believed that little development took place before point B was reached.

The method of curve X was carried out in two different processors, namely a low energy mixer and a high energy kneader. The total cycle time was 2 and a quarter minutes and the maximum energy input was about 24 KW. The energy input in the first stage was 0.88 watt-hours per Kg. and was 4.4 watt-hours per Kg. in the second stage.

EXAMPLES

In each Example, the ingredients were as follows:

| wheat flour | 100% w/w |
|---|---|
| yeast | 2½% w/w |
| fat | 1% w/w |
| salt | 2% w/w |
| ascorbic acid | 0.000075% w/w = 75 ppm |
| water | 58% w/w |

Figure 7:
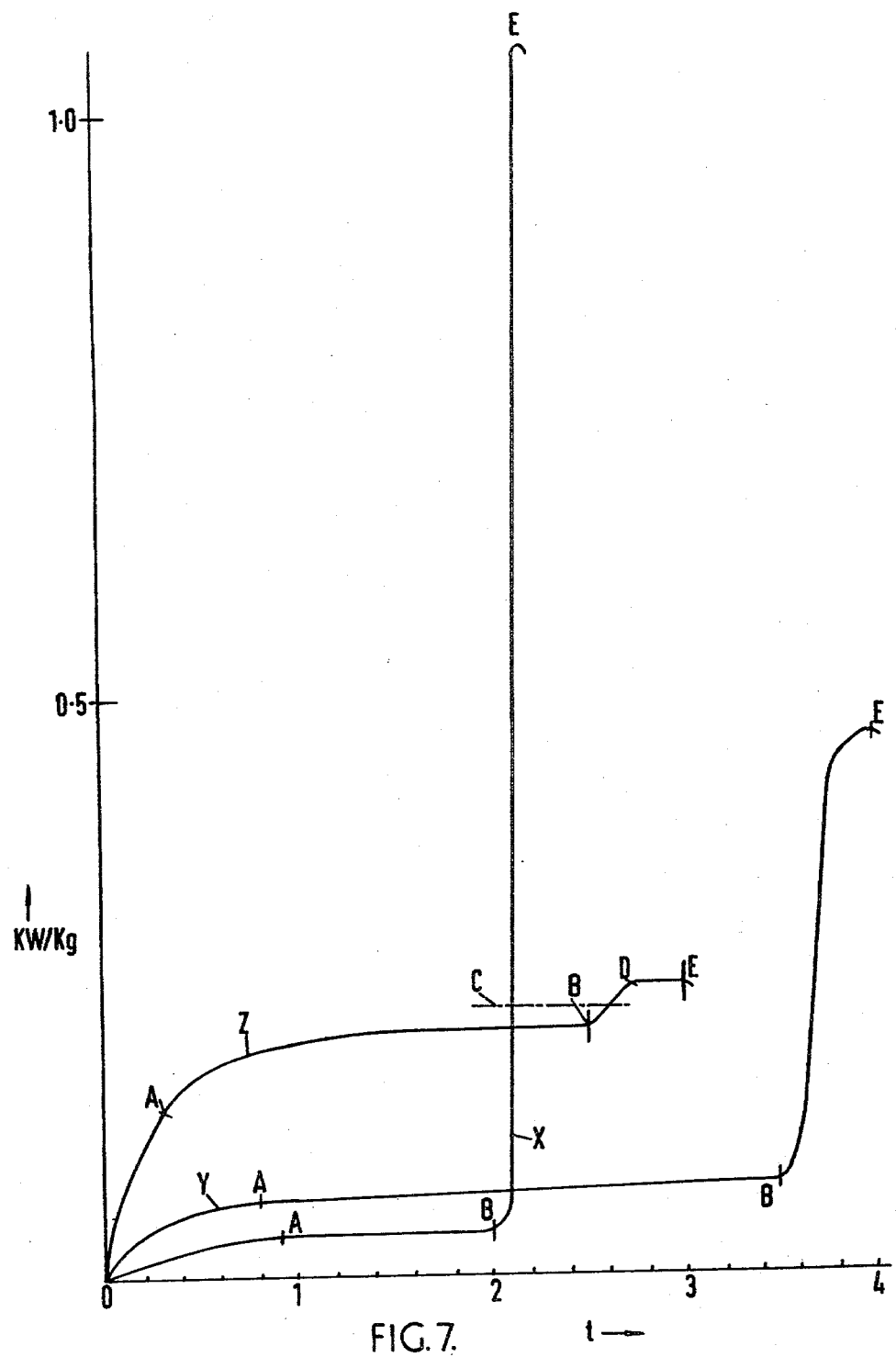
FIG. 7 is a graph of the total energy input, in kilowatts per kilogram, against time in minutes when mixing and working dough in accordance with the invention.

For Examples 1 and 2 (the prior methods), a "Supertex" mixer, as manufactured by Baker Perkins, was used in accordance with the Chorleywood process, with a cycle time of about 3 minutes (the process was run until 11 watt-hours of energy had been consumed per Kg of dough). For Examples 3 and 4, Examples 5 and 6, and Examples 7 and 8, the processes described in relation to curves X, Y and Z (FIG. 7) were used, respectively. In each Example, to obtain a baked product, the worked dough was divided into 0.9 Kg. dough pieces (without any bulk fermentation), given an intermediate proof (ie. allowed to ferment and rise) for 6 minutes at 18° C. and 65% relative humidity, moulded, given a final proof for 55 minutes at 40° C. and 70% relative humidity, and baked at 220° C. for 29 minutes to form bread. This procedure was used for all relevant testing referred to herein.

EXAMPLE

Weak flour, 8.5% w/w protein. Chilled water at 10° C. Total energy consumption 11 watt-hours per Kg. of dough. Baked volume 3.92 cc/gram, below the standard volume for a standard loaf.

EXAMPLE 2

Strong flour, 11.5% w/w protein. Chilled water at 10° C. Total energy consumption 11 watt-hours per Kg. of dough. Baked volume 4.0 cc/gram (standard volume for standard loaf).

EXAMPLE 3

Weak flour, 8.5% w/w protein. Non-chilled water at 25° C. Total energy consumption 4.4 watt-hours per Kg. of dough. Baked volume 4.12 cc/gram (above standard volume for standard loaf). Savings with respect to Example 1: 60% of energy consumption plus cost of chilling the water. Additional savings with respect to Example 2: cost of the flour. Larger volume loaf then in Example 1 or 2.

EXAMPLE 4

Strong flour, 11.8% w/w protein. Non-chilled water at 25° C. Total energy consumption 4.4 watt-hours per Kg. of dough. Baked volume 4.33 cc/gram (above standard volume for standard loaf). Savings with respect to Example 2, 60% of energy consumed plus cost of chilling the water. Larger volume loaf.

EXAMPLES 5 TO 8

Examples 5 and 7 used weak flour as in Example 3 and Examples 6 and 8 used strong flour as in Example 4. In each case, the total energy consumption was 6.6 watt-hours per Kg. of dough and the baked volumes corresponded closely to the respective Example 3 (for weak flour) or Example 4 (for strong flour). However, in Examples 5 to 8, the baked volumes were measured more roughly, by measuring the heights of the loaves.

In Examples 3 to 8, the doughs, both after working and after proving, seemed no different from those of Examples 1 and 2, apart from a very slight appearance of tightness. The difference in volume only became apparent on baking.

Claims 2 to 10 set forth preferred features of the invention.

I claim:

1. A processor comprising:
    a working receptacle having a part-spherical internal wall which forms at least a substantial part of the whole internal wall of the receptacle and which forms at least a substantial part of a hemisphere;
    a working element;
    drive means for rotating the working element relative to the receptacle about a first axis substantially passing through the geometric centre of the part-spherical internal wall and for rotating the working element relative to the receptacle about a second axis inclined to the first axis but also substantially passing through said geometric centre; and
    control means for enabling the working element to be driven only about one of said axes, to execute a simple rotary motion, or about both said axes, to execute a planetary motion, the working element having a radially outer surface which is centred on said geometric centre and is close to the part-spherical internal wall so that it generates an imaginary part-sphere when the working element is rotated about either of said axes.

2. The processor of claim 1, wherein the receptacle has a substantially hemispherical bottom internal wall merging with an upper internal wall whose surface is of substantially circular cross-section having its axis coincident with a said axis of rotation.

3. The processor or of claim 1, wherein there is at least one scraper element which rotates in the upper part of the receptacle about one of said axes of rotation when the working element is executing planetary motion and is stationary when the working element is executing simple rotary motion, the scraper element being adjacent the path of the working element.

4. The processor of claim 1, wherein, for planetary motion, the working element rotates in opposite senses about the two axes of rotation.

5. The processor of claim 1, wherein the working element is of roughly helical shape.

6. The processor of claim 1, wherein the working element is in the form of a single elongate member whose portion which provides said radially outer surface has a sharpened leading edge on its side nearer the receptacle part-spherical internal wall.

7. The processor of claim 1 wherein dough or batter is provided in the working receptacle and means is provided for working the dough or batter in at least two stages, one of which is performed using planetary motion of the working element and the other which is performed using simple rotary motion of the working element.

8. A processor comprising:
    a working receptacle having a part-spherical internal wall which forms at least a substantial part of the whole internal wall of the receptacle and which forms at least a substantial part of a hemisphere;

a working element;

drive means for rotating the working element relative to the receptacle about a first axis substantially passing through the geometric center of the part-spherical internal wall and for rotating the working element relative to the receptacle about a second axis inclined to the first axis but also substantially passing through said geometric centre; and control means for enabling the working element to be driven about one of said axes, to execute a simple rotary motion, or about both said axes, to execute a planetary motion, the working element having a radially outer surface which is centered on said geometric centre and is close to the part-spherical internal wall so that it generates an imaginary part-sphere when the working element is rotated about either of said axes;

the means for driving and controlling the planetary motion of the working element including a main power unit, a control unit, and a differential drive connected to the main power unit and to the control unit.

9. The processor of claim 8, wherein the control unit is a motor which acts as a brake when the reaction load on the motor exceeds a predetermined value, for absorbing energy from the material being worked in the processor.

10. The processor of claim 8, wherein the main power unit and the control unit are constant speed units.

* * * * *